United States Patent [19]

Blust et al.

[11] 3,929,426

[45] Dec. 30, 1975

[54] METHOD OF ANCHORING METALLIC COATED LEADS TO CERAMIC BODIES AND LEAD-CERAMIC BODIES FORMED THEREBY

[75] Inventors: Henry Leo Blust, Marion, Ind.; Norman Lee Lindburg, Berkeley Heights; Dale Vernon Henry, Union, both of N.J.

[73] Assignee: RCA Corporation, New York, N.Y.

[22] Filed: May 8, 1974

[21] Appl. No.: 468,098

[52] U.S. Cl. .................................. 29/195; 29/473.1

[51] Int. Cl.² .......................................... B32B 15/04

[58] Field of Search ........................ 29/195 M, 473.1

[56] References Cited

UNITED STATES PATENTS

| | | | |
|---|---|---|---|
| 2,163,407 | 6/1939 | Pulfrich | 29/195 |
| 2,163,410 | 6/1939 | Pulfrich et al. | 29/195 |
| 2,917,140 | 12/1959 | Omley | 29/195 |
| 3,202,490 | 8/1965 | Velte | 29/195 |
| 3,203,084 | 8/1965 | Best | 29/473.1 |

*Primary Examiner*—L. Dewayne Rutledge
*Assistant Examiner*—E. L. Weise
*Attorney, Agent, or Firm*—G. H. Bruestle; R. J. Boivin

[57] ABSTRACT

Mechanical retension of a lead having a core material with a ductile metal plating of lower melting temperature is provided within a receiving opening of a fired ceramic body by heating the lead within the opening of the ceramic body to a temperature between the melting temperature of the plating on the lead and the melting temperature of the core material of the lead. A charge of molten plating material is formed and cast thereby, substantially by capillary action, within an interstitial opening at the lead-ceramic interface substantially conterminous to surfaces of interior surface irregularities within the opening. Upon cooling, an integral lead-ceramic body is formed wherein the lead is anchored within its receiving opening substantially by the casting of the plating material within the surface irregularities.

3 Claims, 3 Drawing Figures

METHOD OF ANCHORING METALLIC COATED LEADS TO CERAMIC BODIES AND LEAD-CERAMIC BODIES FORMED THEREBY

BACKGROUND OF THE INVENTION

This invention relates to methods of anchoring leads to ceramic bodies.

Ceramic materials have found extensive use, for example, in the manufacture of electron discharge display devices. For this and other applications, it is desirable to secure or anchor a plurality of leads within openings of a fired ceramic body (i.e., provide lead retension therein). The leads, for example, may comprise: wires, ribbons, pins, filaments or posts. It is also desirable in such applications to provide a mechanical anchoring of these various "leads" which is strong and capable of withstanding large temperature differentials. One such application is the anchoring of filamentary mounting posts in apertures of a ceramic substrate used within envelopes of filamentary display devices such as depicted in U.S. Pat. No 3,564,325 issued to R. A. Bonnette and N. L. Lindburg on Feb. 26, 1971.

A simple inexpensive anchoring method is desirable for such applications permitting the use of materials having substantially different coefficients of thermal expansion. Prior art methods have, for example, limited material selection and/or have required the costly and time consuming application of metallization pastes or coatings of ceramic-metal powders on inner wall surfaces of openings provided in the ceramic body. Examples of such methods are for example, described in U.S. Pat. No. 3,241,995 issued to H. Pulfrich et al on Mar. 22, 1966; U.S. Pat. No. 3,010,188 issued to A. Bol et al on Nov. 28, 1961; and U.S. Pat. No. 3,180,020 issued to W. W. Allen et al, on Apr. 27, 1965. These prior art techniques, and others, are, for example, explained in greater detail in W. H. Kohl, Material and Techniques for Electron Tubes N. Y., Reinhold, 1960.

Yet another approach is, for example, described in U.S. Pat. No. 3,024,300 issued to I. E. Martin on Mar. 6, 1962, wherein the application of a compressional axial force at a sealing interface between a ceramic and metallic cylindrical body causes a deformable coating on one member to flow to form a sealing gasket at the interface. This and other compressional type sealing methods are generally impractical for anchoring a plurality of leads to a single substrate. The compressional forces required may, for example, deform or break small leads. Also, the sealing of individual leads would be time comsuming and result in costly assembly.

DESCRIPTION OF THE PREFERRED EMBODIMENTS

Figure 1:
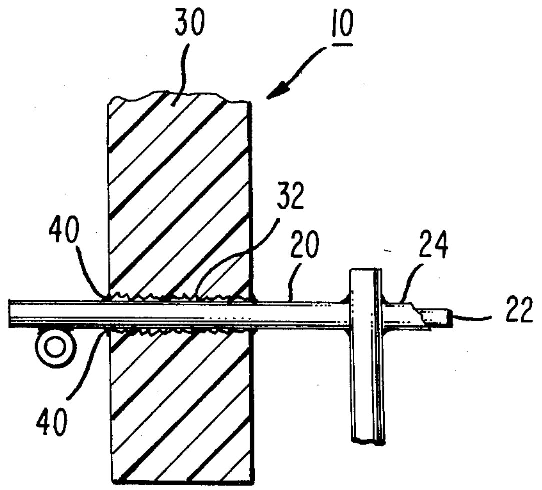
FIG. 1 is an enlarged cross-sectional representation of lead-ceramic body made in accordance with the novel method.

Referring to FIG. 1, an integral lead-ceramic body 10 is depicted wherein a metallic lead 20 is fixably retained (i.e., "anchored") within an opening 32 of a fired ceramic body 30 manufactured in the form of a substrate or wafer. The ceramic composition of the body 30 is not considered critical and may, for example, comprise any of the known alumina or forsterite ceramic compositions. The lead 20 includes a core material 22, of a first material composition, such as, for example, steel, molybdenum, or a nickle-iron alloy, coated or plated by a metallic material 24 of a second material composition. The metallic coating 24 comprises a material such as, for example, copper, silver, or gold, having a melting temperature lower than that of the core material 22. The metallic coating 24 also comprises a material composition substantially incapable of wetting the ceramic body 30. Except as herein qualified, the material compositions of the ceramic body 30, core material 22, and coating 24, may be varied to advantage, and are not otherwise intended to be limited.

The lead 20 is mechanically anchored within the opening 32 primarily by the casting of a portion of the coating material 24 within irregularities or non-uniformities of the ceramic body 30 along the inner wall surface(s) within opening 32, (hereinafter described solely as "irregularities" of the opening 32) which abut(s) the lead-ceramic interface 40.

Prior to the assembly of the integral combination of the lead 20 with the ceramic body 30, by the method hereinafter described, each ceramic body 30 is prepared, formed, or otherwise processed to include a receiving opening 32 having the requisite "irregularities" therein within which the casting herein described may be reliably accomplished. For example, the receiving opening 32 may be punched, drilled, or otherwise provided in ceramic body 30, in a manner well-known in the art, before or after sintering or firing of the ceramic body 30. Importantly, the size and shape of the "irregularities" is not critical except to the extent necessary to provide reliable lead retention for various applications. Similarly, the size and shape of the lead, ceramic body, or receiving opening therein may be varied considerably without substantial adverse effect so long as the capillary forces at the lead-ceramic interface are adequate to accomplish the requisite casting of the material 24 as hereinafter described.

Specifically, I have found the "irregularities" of the type required for providing a reliable retention of electrical mounting posts within display devices, such as described in the above referenced patent of R. A. Bonnette et al, may be easily accomplished by pressing suitable ceramic material compositions at high pressure within dies having removable pins of corresponding size and shape to that desired for the receiving opening 32, in a manner well known in the art.

Each receiving opening 32 is provided with respective cross-sectional dimensions slightly in excess of corresponding cross-sectional dimensions of the lead which is to be inserted therein.

In the manufacture of the integral lead-ceramic-body 10, the lead 20 is inserted into the opening of the fired ceramic body 30 thereby forming an interstitial opening at the lead-ceramic interface 40. The loose assembly thereby formed is then heated to a temperature above the melting temperature of the coating material 24, but below the melting temperature of the core material 22, thereby permitting capillary forces within the lead-ceramic interface (i.e., the interstitial opening between the lead and ceramic bodies) to effectively draw part of the molten coating material 24 into the region of the lead-ceramic interface 40 in a manner whereby a charge of the coating material 24 is formed and thereafter cast substantially conterminous with the surfaces of the irregularities of the opening 32. The time-temperature cycle is accordingly adjusted to provide the requisite flow of the coating material 24 within the interstitial opening or lead-ceramic interface 40.

Subsequent to substantial casting of the molten material 24 in the manner above described, the integral lead-ceramic body 10 is cooled below the melting temperature of the material 24.

It has been discovered that the above method may be utilized to provide mechanically reliable lead retension within openings of various ceramic bodies which is sufficiently strong for the mounting of numerous electrodes in the assembly of many electrical devices and capable of withstanding a wide temperature differential. Surprisingly, the lead retension described occurs in spite of the "non-wetting" characteristics of ceramic bodies in general, or the substantial differing thermal coefficients of expansion for the respective materials.

For non-wetting ceramic and metal materials, prior art techniques have, in general, proven ineffective and/or unreliable for bonding the materials directly, as for example, by brazing or welding techniques, without the interpositioning of other material compositions, surface treatments, and/or other preparations at the lead-ceramic interface 40.

unexpectedly, we have found that a plurality of such leads may be simply and economically "anchored" within corresponding openings of ceramic bodies, directly.

More specifically, wire filamentary mounting posts having an inner core material of steel equivalent to AISI type C1005 and a copper plating approximately 15 percent by weight (i.e. total weight of the plated wire), have, for example, been effectively anchored by the novel method within apertures of ceramic substrates of various ceramic compositions for use in display devices such as described in the previously referred to patent issued to R. A. Bonnette et al. Alumina and forsterite ceramic bodies have been employed to equal advantage for this application. Cross-sectional photomicrographs of such copper coated steel wire posts, "anchored" by the novel method described, within apertures of high alumina and forsterite bodies, respectively, are shown in FIGS. 2 and 3 on a scale of approximately 220*x*.

Figure 2:
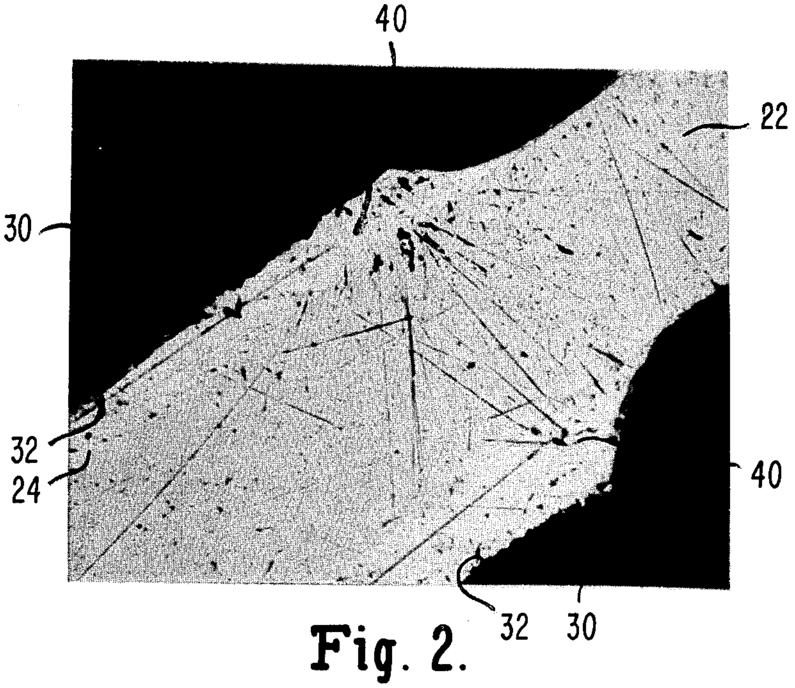
FIGS. 2 and 3 are cross-sectional photomicrographs of representative alumina and forsterite ceramic bodies, assembled with lead wire posts in accordance with the novel method, taken of the interface between the lead and ceramic body at a point of entry of the lead into the ceramic body at a magnification of approximately 220x, and at a varied angle of perspective.
Figure 3:
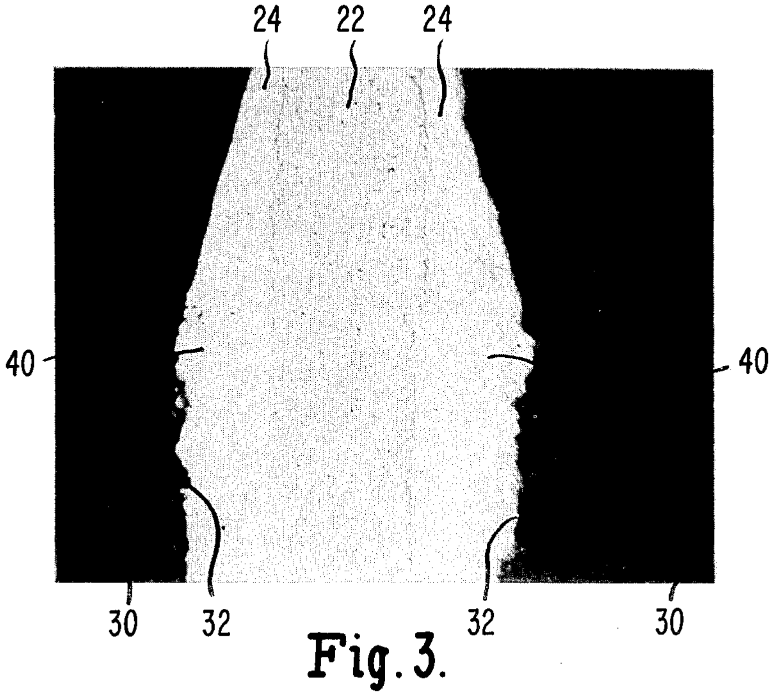

Referring to the representative lead-ceramic bodies depicted in FIGS. 2 and 3, flat ceramic wafers approximately 0.075 inches thick were espectively formed of a Coors Type ADO-90 high-alumina ceramic, (available from Coors Ceramic Co., Golden Colorado) and a Black Forsterite (substantially $2MgO{\cdot}SiO_2$) material. The various creamic powder compositions were pressed in dies at high pressure, and fired in a manner well known in the art, to produce a ceramic wafer having receiving apertures formed therein approximately 16.5 mils in diameter. Copper plated steel wire posts, such as described above, having a diameter about 14 mils were then inserted into their respective receiving apertures, heated therewith in a furnace to a temperature of approximately 1100°C. within a hydrogen atmosphere having a dew point of −35 °C., for a period of about 4–5 minutes, and then gradually cooled to approximately 25°C. over a period of about 20 minutes.

Referring now to FIGS. 2 and 3, the substantial casting of the copper plating material within the surface irregularities of respective receiving openings is clearly visible. As shown, the copper conforms very closely to the contour of (i.e., is substntially conterminous) to the surface irregularites of the receiving openings and provides a strong mechanical retension, or anchoring, of the wire posts which has been found to be stronger than the breaking strength of the wire itself.

When the integral lead-ceramic bodies are cooled from 1100°C. to room temperature, a differential expansion occurs between the ceramic and wire posts. Stresses generated by a ductile copper phase which prevents separation of that metal from the ceramic, and avoids a loss of integrity at that interface.

GENERAL CONSIDERATIONS

While it is generally appreciated that copper does not wet alumina or forsterite ceramics appreciably, it is possible that the moisture content within the hydrogen furnace atmosphere could allow formation of a thin oxide layer at the ceramic-metal interface which promotes better "wetting" of the ceramic by the copper metal. This phenomenon, however, cannot be definitely established. Consequently, a chemical bond of small magnitude may be present at the ceramic-metal interface, however, we consider its contribution to the overall retension of the wire posts relatively insignificant compared to the mechanical retension provided by the "casting" effect previously described.

Generally, the "casting" effect, previously described, appears to be primarily responsible for the mechanical retension of the leads within ceramic bodies. Consequently, the novel method appears applicable to a wide variety of ceramic materials, metal coatings, and lead core materials. Importantly, the core material of the lead must have a melting temperature exceeding that of the coating or plating material. Also, to accomplish effective mechanical retension of the lead, the amount of plating should be adequate to fill the interstitial opening between the ceramic and the lead core upon heating the integral assembly to a temperature above the melting temperature of the plating material. Conversely, the interstitial clearance between two members or bodies should be no larger than the volume of plating material available and also should be adjusted to provide an effective degree of capillary action for the application. A greater or lesser amount of the plating material may be easily provided by adjusting lead length. The lead-ceramic body should be heated during assembly to a temperature above the melting temperature of the plating material, but below that of the core material or that of the ceramic composition; however, the temperature of the heating step is not otherwise considered critical. The time-temperature cycle may also be varied to advantage so long as it is sufficient to permit the formation of an adequate charge of the plating material, and to permit the casting of that material, substantially by capillary action, within the interstitial opening at the lead-ceramic interface substantially conterminous with the irregularities of respective ones of the receiving openings. A ductile material composition for the plating material is preferable but is not generally believed necessary to effectuate mechanical retension of most leads; however, its desirability is increased, as materials having substantially differing thermal coefficient of expansion are utilized.

What we claim is:

1. An integral ceramic-lead body comprising:

a. a fired ceramic body;

b. an opening within said body having an interior surface with irregularities;

c. a lead anchored within said opening, said lead including a core material of a first metallic composition and a plated surface of a second metallic composition, the melting temperature of which is lower than that of said first metallic composition; said first metallic composition being wettable by said second metallic composition; said interior surface being substantially non-wettable by said second metallic composition; and d. means for mechanical retention of said lead within said opening comprising primarily a casting of said second metallic composition within said irregularities of said interior surface.

2. a ceramic-lead body in accordance with claim 1, wherein said second metallic composition comprises material having ductile properties effective to permit deformation of said material cast within said irregularities at tempertures below its melting temperature, said material deformation substantially compensating for thermally caused differential expansion between said core material and said ceramic body whereby a surface portion of said second metallic material is maintained substantially conterminous with the interior surface irregularities of said opening.

3. A ceramic-lead body in accordance with claim 2, wherein said lead includes a core material of steel, and a plated surface of copper.

* * * * *

UNITED STATES PATENT OFFICE
CERTIFICATE OF CORRECTION

PATENT NO. : 3,929,426

DATED : December 30, 1975

INVENTOR(S) : Henry Leo Blust et al

It is certified that error appears in the above-identified patent and that said Letters Patent are hereby corrected as shown below:

| | | |
|---|---|---|
| Columne 1, | Line 23 | "February 26" should be --February 16-- |
| Column 2, | Line 46 | "the" first occurrence should be --that-- |
| Column 3, | Line 52 | "espectively" should be --respectively-- |
| Column 4, | Line 5 | "substntially" should be --substantially-- |
| | Line 13 | after "generated" insert --at the metal-ceramic interface are believed to be relieved--. |

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*